United States Patent [19]

Kapral

[11] 3,912,569
[45] Oct. 14, 1975

[54] COATING SUBSTRATE WITH THERMOSETTING RESIN CONTAINING PRINTED DESIGN

[75] Inventor: Ales M. Kapral, Menasha, Wis.

[73] Assignee: Akrosil Corporation, Menasha, Wis.

[22] Filed: Feb. 27, 1974

[21] Appl. No.: 446,271

[52] U.S. Cl. ............... 156/230; 156/238; 156/240; 427/148; 428/530
[51] Int. Cl.² .......................................... B44C 1/24
[58] Field of Search.................... 156/230, 238, 240; 117/3.4, 3.1, 3.6

[56] References Cited
UNITED STATES PATENTS

| | | | |
|---|---|---|---|
| 3,379,592 | 4/1968 | Ostrowicz | 156/232 |
| 3,511,732 | 5/1970 | Brookfield et al. | 117/3.4 X |
| 3,551,241 | 12/1970 | Heeb et al. | 156/230 |
| 3,661,672 | 5/1972 | McQuade | 156/232 X |
| 3,666,516 | 5/1972 | Dunning | 117/3.4 |
| 3,684,545 | 8/1972 | Worrall | 117/3.4 |
| 3,814,790 | 6/1974 | Kato et al. | 117/3.4 X |

*Primary Examiner*—George F. Lesmes
*Assistant Examiner*—Patricia C. Ives
*Attorney, Agent, or Firm*—Mason, Kolehmainen, Rathburn & Wyss

[57] ABSTRACT

A substrate, such as a core of multiple phenolformaldehyde impregnated paper sheets, is coated with a layer of a thermosetting resin, such as melamine-formaldehyde, having a printed design on its undersurface. The substrate is coated by applying the themosetting resin to a release sheet, printing a design on the resin surface, positioning the coated release sheet over the substrate, hot-pressing the resin to the substrate, and stripping off the release sheet.

6 Claims, No Drawings

3,912,569

COATING SUBSTRATE WITH THERMOSETTING RESIN CONTAINING PRINTED DESIGN

This invention relates to a product and method of applying a printed layer of a thermosetting resin onto a substrate and more particularly a method of coating in substrate with a layer of a melamine-urea-formaldehyde resin and the product made thereby.

BACKGROUND OF THE INVENTION

In the manufacture of decorative articles such as floor or wall coverings, tiles and furniture surfaces, it is desirable to provide a surface layer of tough, durable, scratch resistant material. Further, it is desirable to provide a design in the surface material or in a layer below the surface which can be readily seen through the surface.

One example of the manufacture of a decorative product having a surface design and a top layer of a tough, durable, scratch resistant resin is in the manufacture of high pressure laminates such as "Formica," a laminate produced by hot-pressing a plurality of phenolic resin impregnated paper core sheets and a designed, melamine resin impregnated top sheet. The sheets are stacked so that the designed melamine resin impregnated sheet is on top. The stacked sheets are then laminated at temperatures of about 250° to 310°F. and pressures of about 800 to 1600 psi. The melamine resin becomes transparent on hot-pressing so that the designed top sheet can be seen through the melamine. One example of a high-pressure laminate formed using a melamine impregnated top sheet is disclosed by McQuade - U.S. Pat. No. 3,661,672.

It has also been known that a printed design can be applied directly to a thermoplastic resin layer such as a vinyl resin, polyester resin, or polyethylene and the designed resin layer transferred to a substrate to form the top layer thereof. Generally, the thermoplastic resin layer is applied to a paper release sheet, a design printed thereon and then the resin coated sheet is applied over a substrate. The sheet is then hot-pressed to fuse the thermoplastic layer to the surface of the substrate, and the paper release sheet is stripped away. In that manner, an expensive alpha cellulose overlay sheet (resin impregnated sheet) could be eliminated with substantial savings.

In many applications, however, it is necessary to provide a thermosetting top layer since the substrate is used in environments where the surface may be heated above the plasticity temperature of available thermoplastic materials. The excellent heat resistance, impact strength, hardness and low water absorption of the melamine resins would seem to make them desirable to be used as a top layer on any substrate where these properties are desirable.

With prior-art methods of coating a substrate with a designed thermosetting resin (such as melamine and/or urea-formaldehyde resin) an expensive sheet of high grade print paper is impregnated with the resin and the impregnated paper sheet hot-pressed to the surface of the substrate to form an overlay. The prior-art overlay sheet becomes an integral part of the surface of the product. It has heretofore been impossible to apply a design directly onto a thermosetting resin layer and to transfer that layer to the surface of a substrate without using a resin impregnated overlay sheet. In particular, melamine coatings have always been applied as a melamine impregnated paper sheet, whereby the melamine becomes translucent on hot-pressing; or as a sprayed film of liquid resin without a design and applied after hot-pressing.

One reason for the inability to apply a printed design directly onto a thermosetting resin without using an impregnated paper sheet is because the resin on which a printing ink is applied has to be non-impregnable so that the ink will not rise through the resin layer and into the release sheet. If the ink were to impregnate the resin film and contact known release sheets, it would be difficult, if not impossible, to smoothly strip the release sheet from the surface of the substrate after hot-pressing. See, for example, the Ostrowicz U.S. Pat. No. 3,379,592. It is known that an overlay sheet impregnated with a thermosetting resin cured to the B-stage is extremely brittle. Any embossing or printing of such an impregnated overlay sheet is very difficult and costly. However, until applicant's invention, no one has been able to print a design directly onto a thermosetting resin without also using an impregnated overlay sheet.

One attempt to provide an overlay sheet impregnated with a thermosetting resin which could not be embossed and printed is disclosed in McQuade U.S. Pat. No. 3,661,672. In McQuade, the resin is first cured to a sub-B stage ("green") and cushions provided for lamination. However, the impregnated overlay sheet of U.S. Pat. No. 3,661,672 is cured to the B-stage when printed and is very brittle at both the B-stage and sub-B-stage of curing.

OBJECTS OF THE INVENTION

In brief, a method has been found whereby a melamine resin layer having a design printed directly thereon can be transferred to the surface of a substrate to produce an article having a designed melamine coated surface.

A primary object of the present invention is to provide a substrate having a decorated melamine film securely adhered to the substrate surface.

Another object of the present invention is to provide a method of manufacturing a molded product having a surface layer of a designed melamine resin.

A further object of the present invention is to provide a high pressure laminated product having a printed melamine resin surface layer.

A still further object of the present invention is to provide a method of manufacturing a laminated product in which a surface layer of melamine resin can be provided without the necessity of also securing a paper sheet to said surface.

These and other objects and advantages of the present invention can best be understood from the following detailed description of the invention.

DETAILED DESCRIPTION OF THE INVENTION

The thermosetting resin layer to be transferred to the surface of a substrate is first coated on a special release sheet. The release sheet comprises a sheet of organic material such as paper coated with a thin film of a releasing agent. The release sheet supports the melaime so that it can be printed without breaking due to brittleness.

The release sheet is important to the process of this invention to achieve proper stripability. In practical application, it is desirable to select a proper cellulose sheet of basis weight in the range of about 60–200 lbs. per ream, preferably 180 lbs. per ream. The release coating can be a fluorocarbon or silicone composition such as described in my U.S. Pat. No. 3,575,917 or one of the commercial silicone release coatings such as Dow Corning XC-4-2125, Syl-Off 23 or Syl-Off 291. Also, a fatty acid chromium complex can be used as a releasing agent.

It is possible to coat such a sheet with silicone from a water emulsion or with a solvent solution of silicone polymer. A solvent solution of a curable silicone polymer with an appropriate catalyst is preferred but water emulsions can also be used. Water emulsions by virtue of wetting paper fibers require harsher drying than solvent solutions. For silicone solutions in organic solvents a 20 percent solids is the preferred concentration, although 2–100 percent solids solutions can be applied. Coating can be done by any coating method such as air-knife, gravure rollers and the like; preferred is wire rod application. Cure time is between about 3 seconds to about 3 minutes, preferably 15 seconds. The releasing film should be applied in an amount of about 1–10 pounds per ream of organic release sheet material.

Such releasing sheet coated with high solids silicone is in a following operation over-coated with a film which must partially adhere to the releasing surface as to be able to withstand handling, shipping and printing without rub-off. It was found that a variety of different over-coating organic materials can be used.

One very useful over-coating material is a solvent coating based on an aliphatic polyurethane elastomeric compound which does not contain any free reactive isocyanate group. The over-coating material (supplied as Alfa-841 by Baker Urethanes, The Baker Caster Oil Company, Bayone, N.J.) forms from a 20 percent solids solution an uninterrupted flexible film. When this procedure is used in the manufacture of a urea-formaldehyde-phenol-formaldehyde laminate application, the over-coating material can be a thermosetting melamine-urea-formaldehyde lacquer in alcoholic media, an ethyl cellulose solution in an aliphatic solvent, or a vinyl chloride polymer solution. In any case, the releasing sheet should be over-coated with lacquer at between 0.2–6 lb. solids per thousand square feet. Such dry coating should be easily removably by any sticky surface, for instance, Scotch tape.

The release sheet coated with the designed thermosetting resin in positioned so that the resin surface is in contact with the substrate surface to be coated. The substrate and decorative resin coated release sheet are then hot-pressed under heat on the order of about 250°F to 310°F and under pressure of approximately 800–1600 psi until the resin has become thermoset and integrally bonded to the surface of the substrate. The release sheet is then stripped from the surface of the laminated product to provide a designed thermosetting resin coating. The design is on the under surface of the thermosetting resin and is seen through the resin. The resin thickness protects the design from being damaged. The release sheet can be re-used. If desired, an embossed surface can be provided.

During hot-pressing the thermosetting resin on the sheet material becomes intimately bonded to and becomes an integral part of the substrate on which it is positioned. The design on the flexible resin film is likewise transferred to the surface of the substrate and is tenaciously bonded thereto. A further advantage of this operation is that the design or printed material is now covered by the film of thermosetting resin and is protected from the atmosphere, scratching and abrasion by external objects, thus making the design more durable and long-lasting. When removed from the hot-press, the product has an ornamental design visible through a transparent top layer of thermosetting resin and protected by the resin layer. Thus, the objects are ready for use without further treatment.

The particular substrate on which the printed thermosetting resin is adhered is not an important feature of applicant's invention. Table tops, desk tops, counter tops, wall paneling, floor, ceiling coverings and melamine dinnerware are all examples of substrates to which the thermosetting resin of the present invention may be adhered. A particularly desirable substrate is a core material having a plurality of phenolic resin impregnated paper sheets. For example, four to eight layers of alpha-cellulose paper sheets impregnated with phenol-formaldehyde resin, stacked and pressed during the same hot-pressing step used to apply a thermosetting resin layer provides an extremely hard, attractive and permanent laminate quite useful in the furniture, wall, floor and ceiling covering art.

As other examples of materials to be printed or have a design secured thereto is a sheet of fiberglass or a polyester resin. Designed or printed panels of fiberglass can be made by pressing the fiberglass into the above described prepared resin coated release sheet, whereby the design implanted flexible resin film is transferred from the organic sheet to the fiberglass resulting in a more rigid and more decorative product.

Any of the thermosetting resins may be used either as the substrate or as the design-implanted film in accordance with the process of this invention. These include phenol-formaldehyde; phenol-furfural; urea-formaldehyde; and melamine-formaldehyde resins. Melamine-formaldehyde, urea-formaldehyde and mixed urea-melamine-formaldehyde resins have particular utility. Normal molding equipment and the usual molding cycles can suitably be used for hot-pressing in accordance with the process of this invention.

Mixed urea-melamine-formaldehyde resins are disclosed in U.S. Pat. No. 3,320,192. The mixed resins combine the optimum properties of melamine and urea resins, namely, the excellent heat resistance, impact strength, hardness and low water absorption of the melamine resins, and the better tensile strength, flexural strength, dielectric strength, plasticity and lower shrinkage of the urea resins.

A thermosetting melamine-urea-formaldehyde resin mixture in alcoholic media can be used. In any case, the releasing sheet should be over-coated with thermosetting resin at between 0.2–6 lb. solids per thousand square feet. The resin coating is then dried. When in contact with foamed plastic in formation it should transfer clearly from the release sheet.

When the hot-press step has been completed, the flexible resin film, which has become intimately bonded to the substrate, remains on the surface of the substrate forming a new surface. The graphic or ornamental design applied to the film is transferred to the substrate. The organic release sheet material can be any type of woven or non-woven materials including paper, cloth, fabric or other web materials. It can be made of parchment, glassine or other webs made from cellulose fibers or modified cellulose fibers, such as wood fibers, cotton, bagasse, hemp, carboxymethyl cellulose, carboxyethyl cellulose, mixture thereof, and all webs made from synthetic fibers such as polyester, polyamide, polyethylene, polypropylene, vinyl resins, or mixtures thereof, natural fibers, such as asbestos, and any other material capable of withstanding the hot-pressing temperatures of the herein described hot-pressing step.

One particularly useful substrate is a thermosetting resin molded article such as melamine dinnerware. The melamine resin core can be filled, for example, with alpha cellulose.

The only commercial method for the decoration of melamine dinnerware known heretofore involves the use of an impregnated paper system. In this system, a pure cellulose paper is printed in rolls and is then impregnated with a melamine resin. The impregnated rolls are then continuously dried and are then cut up to provide individual, printed and impregnated paper sections which are identical in size to that of the surface of which they are to be applied to provide the desired decoration thereon. These sections are applied to the surface of semi-molded plastic articles during the molding cycle, the curing being thereafter completed in the mold under the influence of heat and pressure. Prior to the final completion of the molding cycle, a second thin impregnated, undecorated paper layer may be placed over the design-bearing layer for protection of the latter. In this process, the impregnated paper sheet remains permanently embedded at or near the surface of the molded article and, consequently, the paper itself contributes, often undesirably, to the final appearance of the decorated article.

Because of the presence of the paper layer in the molded articles, it has not been possible heretofore on a commerical basis to produce translucent or white molded articles. It is evident that articles containing a solid paper layer cannot be translucent, and the production of white molded articles was not feasible because the paper layer imparts a grayish cast to the article after molding. Another problem in the use of the impregnated paper layer is that, in order to avoid non-uniformity in the appearance of the articles, the impregnated paper sheet must cover the entire surface of the article even though the design takes up only a small area thereof. Further, if the impregnated paper sheet is shifted in its position during the molding process, the article must be discarded because the paper sticks over the edges in places and does not cover the surface in other places. The retention of the paper layer in the molded articles, even where whiteness and translucency are not desired, affects adversely the original color of the molded articles. The expense of the impregnated paper is another undesirable factor in that such paper, because of the pure cellulosic stock required and the several processing steps involved, has undesirably high costs.

One method has recently been found for decorating thermosetting dinnerware by using a non-impregnable fiber capable of withstanding molding temperatures 3,379,592 - Ostrowicz. However, with the Ostrowicz process, the ink design is left on the outer surface of the product necessitating spraying the designed surface with a layer of liquid melamine. In accordance with the present invention, a thermosetting substrate can be molded having a prefectly white outer surface except for the desired design, and the product will have a design protected from damage when removed from the mold.

What is claimed as new and desired to be secured by Letters Patent of the United States is:

1. A method of coating a substrate with a layer of a thermosetting resin having a printed design therein comprising:
    coating a release sheet with a layer of a thermosetting resin selected from the group consisting of: melamine-formaldehyde, urea-formaldehyde, melamine-urea-formaldehyde and mixtures thereof in an amount of 0.2–6 pounds solids/1000 ft.$^2$, said release sheet being strippable from a substrate after the coated release sheet is hot-pressed onto the surface of said substrate;
    partially curing the layer of thermosetting resin;
    applying a printed design onto the thermosetting resin surface to provide a designed thermosetting resin coated release sheet;
    positioning said coated release sheet onto a substrate to contact the resin side of the coated release sheet with a surface of the substrate;
    hot-pressing the coated release sheet against the substrate surface to thermoset the resin layer and adhere the resin layer to the substrate; and
    stripping the release sheet from the surface of the resin coated substrate to provide a designed coating layer of a thermosetting resin not containing a paper overlay sheet as the first substrate layer.

2. The method as defined by claim 1 wherein the substrate comprises a plurality of phenol-formaldehyde impregnated paper sheets.

3. The method as defined by claim 1 wherein the substrate comprises a molded melamine article.

4. The method as defined by claim 2 wherein hot-pressing is carried out at about 250°–310°F. and about 800–1600 psi.

5. The method as defined by claim 1 wherein the release sheet comprises a cellulose sheet coated with about 0.2–6 pounds of silicone or fluorcarbon per thousand square feet.

6. The method as defined by claim 5 wherein the substrate is a molded melamine article.

* * * * *